(12) United States Patent
Liu

(10) Patent No.: US 12,114,115 B2
(45) Date of Patent: Oct. 8, 2024

(54) VIRTUALIZATION METHOD AND APPARATUS

(71) Applicant: ZTE Corporation, Shenzhen (CN)

(72) Inventor: Suyong Liu, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 233 days.

(21) Appl. No.: 17/641,467

(22) PCT Filed: Sep. 11, 2020

(86) PCT No.: PCT/CN2020/114862
§ 371 (c)(1),
(2) Date: Mar. 9, 2022

(87) PCT Pub. No.: WO2021/077940
PCT Pub. Date: Apr. 29, 2021

(65) Prior Publication Data
US 2022/0337926 A1    Oct. 20, 2022

(30) Foreign Application Priority Data

Oct. 21, 2019  (CN) .......................... 201911001566.5

(51) Int. Cl.
*H04Q 11/00*     (2006.01)
*H04L 41/0895*   (2022.01)

(52) U.S. Cl.
CPC ..... *H04Q 11/0071* (2013.01); *H04L 41/0895* (2022.05); *H04Q 2011/0086* (2013.01)

(58) Field of Classification Search
CPC . H04L 41/0895; G06F 3/0688; G06F 3/0664; H04Q 2011/0086;
(Continued)

(56) References Cited

U.S. PATENT DOCUMENTS

| | | | | |
|---|---|---|---|---|
| 2019/0387295 A1* | 12/2019 | Zhang | ................ | H04Q 11/0067 |
| 2022/0209995 A1* | 6/2022 | Wang | .................... | H04L 45/566 |
| 2022/0210060 A1* | 6/2022 | Wang | .................. | H04L 12/4641 |

FOREIGN PATENT DOCUMENTS

| | | |
|---|---|---|
| CN | 108111931 A | 6/2018 |
| CN | 108989915 A | 12/2018 |

(Continued)

OTHER PUBLICATIONS

International Search Report for corresponding application PCT/CN2020/114862 filed Sep. 11, 2020; Mail date Nov. 27, 2020.
(Continued)

*Primary Examiner* — Benjamin M Thieu
(74) *Attorney, Agent, or Firm* — CANTOR COLBURN LLP

(57) ABSTRACT

Provided are a virtualization method and apparatus. The virtualization method applied to a main control board includes that: a resource of a line card board is allocated to a slice of a virtualization system of the main control board, wherein the slice includes: a management slice and/or an ordinary slice; and cross-board communication between the virtualization system of the main control board and a virtualization system of the line card board is implemented by means of communication between the management slice of the main control board and a management slice of the line card board.

18 Claims, 8 Drawing Sheets

Allocate a resource of a line card board to a slice of a virtualization system of the main control board, the slice including: a management slice and/or an ordinary slice  — S110

Implement cross-board communication between the virtualization system of the main control board and a virtualization system of the line card board by means of communication between the management slice of the main control board and a management slice of the line card board  — S120

(58) Field of Classification Search
CPC ..... H04Q 2213/13399; H04Q 11/0062; H04Q 2011/0079
See application file for complete search history.

(56) References Cited

FOREIGN PATENT DOCUMENTS

| | | | |
|---|---|---|---|
| CN | 109787849 A | 5/2019 | |
| EP | 3579461 A1 | 12/2019 | |
| WO | WO-2018157299 A1 * | 9/2018 | ............. H04B 10/27 |
| WO | 2019083841 A1 | 5/2019 | |

OTHER PUBLICATIONS

"Initial Split Architecture and Open Floow Protocol Study D 3.1" Oct. 1, 2010, XP055079777.
European Search Report for corresponding application EP20879296; Report dated Dec. 9, 2022.

* cited by examiner

Single-slice system                    Multi-slice system

VIRTUALIZATION METHOD AND APPARATUS

CROSS REFERENCE

This application is a National Stage Filing of the PCT International Application No. PCT/CN2020/114862 filed on Sep. 11, 2020, which claims priority to a Chinese Application No. 201911001566.5 filed with China National Intellectual Property Administration on Oct. 21, 2019, the entirety of which is herein incorporated by reference.

TECHNICAL FIELD

The present disclosure relates to the field of optical communication technologies, and more particularly, to a virtualization method and apparatus.

BACKGROUND

An Optical Line Terminal (OLT), as a core of an optical access network based on optical fibers, is equivalent to a switch or a router in the traditional communication network, and is also a multi-service providing platform. The OLT is generally placed at a central office and provides user-oriented fiber interfaces of a Passive Optical Network (PON). The OLT mainly implements functions as follows: on the one hand, signals carrying various services are aggregated at the central office and sent to an access network for transmission to an end user according to a certain signal format; on the other hand, signals from the end user are sent to various service networks respectively according to the types of services.

At present, an OLT device usually needs to carry the services of thousands of users, and different users have different requirements. In the related art, by redeploying a new OLT device, multiple virtual OLT systems can be created on the OLT device. Each virtual OLT system is isolated from each other to meet different requirements of multiple services.

However, the existing OLT device of a provider usually has multiple slots, for some peripheral slot line cards, multiple virtual OLT systems may not be supported due to limited software and hardware resources. Therefore, a virtualization management mode of multiple virtual OLT systems cannot improve the utilization ratio of the devices with limited resources of the provider.

SUMMARY

Embodiments of the present disclosure provide a virtualization method and apparatus, which can implement virtualization management of a device with limited resources and improve resource utilization.

According to a first aspect, the embodiments of the present disclosure provide a virtualization method, which is applied to a main control board and includes that: a resource of a line card board is allocated to a slice of a virtualization system of the main control board, the slice including: a management slice and/or an ordinary slice; and cross-board communication between the virtualization system of the main control board and a virtualization system of the line card board is implemented by means of communication between the management slice of the main control board and a management slice of the line card board.

According to a second aspect, the embodiments of the present disclosure provide a virtualization method, which is applied to a line card board and includes that: a virtualization multi-slice system or a virtualization single-slice system is configured for the line card board according to a quantity of a resource of the line card board, the virtualization multi-slice system including: a management slice and an ordinary slice, and the virtualization single-slice system including: a management slice; and cross-board communication between a virtualization system of the line card board and a virtualization system of a main control board is implemented by means of communication between the management slice of the line card board and a management slice of the main control board.

According to a third aspect, the embodiments of the present disclosure provide a virtualization apparatus, which may include: a memory, a processor and a virtualization program which is stored in the memory and capable of running on the processor. The virtualization program, when being executed by the processor, implements operations of the above virtualization method.

According to a fourth aspect, the embodiments of the present disclosure provide a computer-readable storage medium, in which a virtualization program is stored. The virtualization program, when being executed by the processor, implements operations of the above virtualization method.

Compared with the related art, according to the virtualization method and apparatus provided in the embodiments of the present disclosure, a main control board allocates a resource of a line card board to a slice of a virtualization system of the main control board, the slice including: a management slice and/or an ordinary slice; the line card board configures a virtualization multi-slice system or a virtualization single-slice system for the line card board according to a quantity of the resource of the line card board, the virtualization multi-slice system including: a management slice and an ordinary slice, and the virtualization single-slice system including: a management slice; and cross-board communication between the virtualization system of the line card board and the virtualization system of the main control board is implemented by means of communication between the management slice of the main control board and the management slice of the line card board. The technical solutions of the embodiments of the present disclosure can implement virtualization management of a device with limited resources and improve resource utilization.

DETAILED DESCRIPTION

In order to make the purpose, technical solutions and advantages of the embodiments of the present disclosure clearer, the embodiments of the present disclosure will be described below in combination with the drawings in detail. It is to be noted that the embodiments in the present disclosure and the characteristics in the embodiments may be combined under the condition of no conflicts.

These operations shown in the flowchart of the accompanying drawings can be executed in a computer system such as a group of computer executable instructions. Moreover, although a logical sequence is shown in the flowchart, in some cases, the shown or described operations may be performed in a sequence different from that described herein.

First Embodiment

Figure 1:
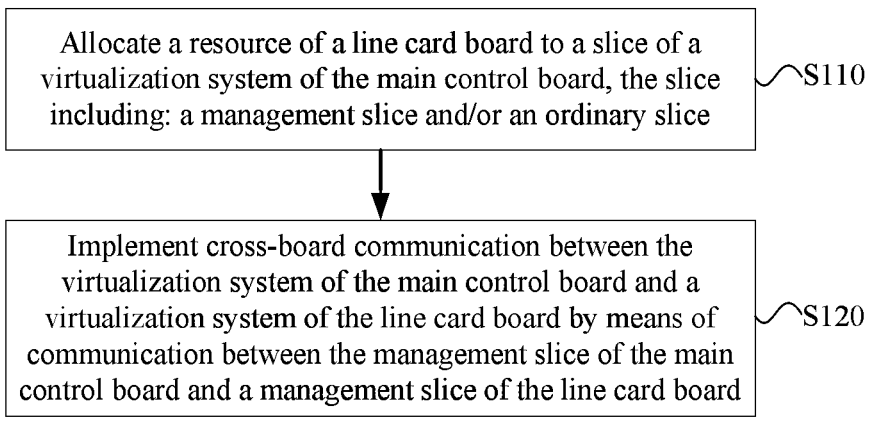
FIG. 1 is a flowchart of a virtualization method (applied in a main control board) according to a first embodiment of the present disclosure.

As shown in FIG. 1, the embodiments of the present disclosure provide a virtualization method, which is applied to a main control board, and includes the following operations.

At S110, a resource of a line card board is allocated to a slice of a virtualization system of the main control board, the slice including: a management slice and/or an ordinary slice.

At S120, cross-board communication between the virtualization system of the main control board and a virtualization system of the line card board is implemented by means of communication between the management slice of the main control board and a management slice of the line card board.

In an implementation, the operation that the cross-board communication between the virtualization system of the main control board and the virtualization system of the line card board is implemented by means of the communication between the management slice of the main control board and the management slice of the line card board may include that:

after the resource of the line card board is allocated to the ordinary slice of the main control board, data is forwarded between the ordinary slice of the main control board and the virtualization system of the line card board by using the management slice of the main control board as a communication proxy of the virtualization system of the main control board.

In an implementation, the operation that the resource of the line card board is allocated to the slice of the virtualization system of the main control board may include that: the resource of the line card board is allocated to the management slice or the ordinary slice of the main control board at a board-level granularity; or the resource of the line card board is allocated to the management slice or the ordinary slice of the main control board at a port-level granularity and in a port exclusive mode; or the resource of the line card board is allocated to the management slice and the ordinary slice of the main control board at a port-level granularity and in a port sharing mode.

In an implementation, the operation that the data is forwarded between the ordinary slice of the main control board and the virtualization system of the line card board by using the management slice of the main control board as the communication proxy of the virtualization system of the main control board may include that: after the management slice of the main control board receives data from the virtualization system of the line card board, in a case where the data carries identifier information of an ordinary slice of the line card board, the data is forwarded to the ordinary slice of the main control board corresponding to the ordinary slice of the line card board. In this implementation, a virtualization multi-slice system is configured for the line card board, the virtualization multi-slice system includes: the management slice and the ordinary slice, and the ordinary slice of the line card board has a one-to-one correspondence with the ordinary slice of the main control board.

In an implementation, the operation that the data is forwarded between the ordinary slice of the main control board and the virtualization system of the line card board by using the management slice of the main control board as the communication proxy of the virtualization system of the main control board may include that: after the management slice of the main control board receives data from the virtualization system of the line card board, in a case where the data carries identifier information of the management slice of the line card board, a resource allocation granularity of the line card board is queried; and in a case where the resource allocation granularity of the line card board is a board-level granularity, the ordinary slice of the main control board to which the line card board belongs is determined, and the data is forwarded to the ordinary slice of the main control board; in a case where the resource allocation granularity of the line card board is the port-level granularity, the ordinary slice of the main control board to which a line card port belongs is determined, and the data is forwarded to the ordinary slice of the main control board.

In an implementation, the operation that the data is forwarded between the ordinary slice of the main control board and the virtualization system of the line card board by using the management slice of the main control board as the communication proxy of the virtualization system of the main control board may include that: the ordinary slice of the main control board sends to-be-sent data which is sent to the line card board to the management slice of the main control board; in a case where a virtualization multi-slice system is configured for the line card board, the management slice of the main control board sends the to-be-sent data to the management slice of the line card board; in a case where a virtualization single-slice system is configured for the line card board, the management slice of the main control board changes the slice to which the to-be-sent data belongs to the management slice of the line card board, and sends the to-be-sent data to the management slice of the line card board. In the implementation, in a case where a virtualization multi-slice system is configured for the line card board, the management slice of the line card board receives data forwarded by the management slice of the main control board; in a case where the data actually belongs to the management slice of the line card board, the data is processed by the management slice of the line card board; in a case where the data actually belongs to the ordinary slice of the line card board, the data is forwarded by the management slice of the line card board to the ordinary slice of the line card board for processing; and in a case where a virtualization single-slice system is configured for the line card board, the management slice of the line card board receives and processes the data forwarded by the management slice of the main control board.

In an implementation, the management slice of the main control board first loads and validates configuration data, and then the ordinary slice of the main control board loads a private configuration file of the ordinary slice.

In an implementation, the management slice of the main control board maintains state information of the line card board, and synchronizes the state information of the line card board to the ordinary slice, to which the resource of the line card board belongs, of the main control board.

The "slice" here is a general name for an independent logical network element in a virtualization system, and is also referred to as virtual-network-device and equivalently abbreviated to the letters "VND" in the embodiments of the present disclosure. The management slice is represented by VND0, and the ordinary slice is represented by VNDx, where x is equal to 1, 2, 3 . . . . The management slice is a slice with management permission. The ordinary slice is a slice with ordinary permission, and is started and managed by the management slice as needed. Generally, the management slice carries a software application necessary for the normal operation of a physical network device. The ordinary slice carries some extended applications (which are mainly applications related to a logical service).

In an implementation, the slice of the virtualization system is a single process or multiple processes. If the original software architecture of the main control board is a single-process architecture, each slice adopts also the single-process architecture after the virtualization multi-slice system is supported. The single process in the original software architecture serves as the management slice VND0 of the virtualization multi-slice system, and other ordinary slices (a non-management slice is equivalently represented by VNDx later, note that VNDx does not include VND0) exist in the same mirror mode as the process of the management slice. If the original software architecture of the main control board is a multi-process architecture, the multiple processes in the original software architecture form a management slice VND0, and other ordinary slices exist in the same mirror mode as the multiple processes of the management slice.

A system-level command switch for switching between the virtualization single-slice system and the virtualization multi-slice system is added to the original software architecture. The command switch supports dynamic configuration, and includes, but is not limited to, a Command Line Interface (CLI) and a network management command. In a case where the current system is the virtualization single-slice system, the system automatically switches to the virtualization multi-slice system after the switch is executed. In a case where the current system is the virtualization multi-slice system, the system automatically switches to the virtualization single-slice system after the switch is executed.

In an implementation, the management slice is configured to perform at least one of the following management to the ordinary slice of the virtualization system: creating the ordinary slice, deleting the ordinary slice, enabling the ordinary slice, disabling the ordinary slice, allocating a resource for the ordinary slice, reclaiming the resource allocated to the ordinary slice, deploying a CPU of the ordinary slice, setting a mode of the ordinary slice, querying information of the ordinary slice, and switching an interface of the ordinary slice.

The mode of the ordinary slice includes: a mixed mode (default), a board mode, a port exclusive mode, and a port sharing mode. The mixed mode is that the board mode, the port exclusive mode and the port sharing mode are supported, that is, resource allocation is not limited. Software modules insensitive to slice information may be transformed into a multi-slice instance. Data, management messages and protocol packets between different slices of such software modules are isolated from each other, which are implemented basically the same under the management slice VND0 and the ordinary slice VNDx. Such software modules are, for example, Operation Administration and Maintenance (OAM), protocol stacks, broadband services, and PON services, etc.

The software module that cannot be transformed into the multi-slice instance is set to a single process or directly belongs to the management slice. The data of the software module is set as global data, and a slice ID is added during data transmission to distinguish different slices.

The management slice VND0 system includes a full set of implementations, while the implementations on the ordinary slice VNDx are reduced on this basis (for example, global system functions, such as version management and board addition and deletion, need to be removed). A slice distinguishing task or a process registration mechanism is provided to enable a service to choose whether a task or process is to be started under a slice. Moreover, a slice identifying interface is also provided to enable a service to determine which slice the service is currently running in, so as to process differentially. For centrally controlled management modules, such as an Operation Manager (OM) and a slice manager, which are mainly implemented in the management slice VND0, it is needed to synchronize, according to the allocation of resources in a slice, data required by a slice to the corresponding slice through a cross-process communication mechanism between slices, so as to meet the needs of a slice function.

The management slice VND0 and the ordinary slice VNDx have their respective independent file systems. The file systems of the slices may be created during the running of the systems. Slice directories are named according to a certain naming rule. The file system of each slice includes, but is not limited to, a configuration file, an Optical Network Unit (ONU) file, and so on. An ordinary slice VNDx cannot operate the file system of the other ordinary slice VNDx, and the management slice VND0 can operate and manage the file systems of all the ordinary slices.

Each slice has its own independent configuration file, but the loading of the corresponding configuration files during startup of respective slices is not completely concurrent, mainly because the management slice VND0 is not exactly equivalent to the ordinary slice VNDx. A global data set of the system exists only in the management slice VND0, the ordinary slice VNDx only has a private data set of the slice, and the configuration data of the ordinary slice VNDx actually depends on global configuration data of the management slice VND0. Therefore, there is such a constraint on a startup loading time sequence of the slice: the management slice VND0 first loads and validates configuration data (in fact, this process is consistent with the startup of a virtualization single-slice system), and then the ordinary slice VNDx loads a private configuration file of the slice. There is no time sequence dependence between the ordinary slices VNDx. Each slice has its own file directory, and during the loading of the configuration file, it is needed to read configuration file information from a file system directory to which the slice belongs.

The resource allocation granularities of line cards with different capabilities may be different. For a resource limited line card which cannot support the creation of a multi-slice instance, a virtualization single-slice system is allowed to be configured for this type of line card. In this case, this type of line card still supports the allocation to the ordinary slice VNDx of the main control board in a board-level granularity and a port-level granularity, at the same time, the belonging configuration of the resources with different granularities of the line card is adaptively controlled at the main control board during message exchange. As such, resource allocation and reclaiming management of the line card can be completed only by adding individual message control between the virtualization multi-slice system of the main control board and the virtualization single-slice system of the line card, at the same time, information, such as the state of the line card board and related alarm, may also be controlled to be the presented under the ordinary slice to which the line card belongs and the management slice, and is not visible to other ordinary slices.

For a line card that cannot create a multi-slice instance, when this type of line card is allocated to the ordinary slice VNDx of the main control board in a port-level mode, a single-slice instance of the current line card is physically and logically equivalent to the management slice VND0. After a part of ports of the line card are logically allocated to the ordinary slice VNDx, information interaction between the ports and the main control board needs to be forwarded to the ordinary slice VNDx. After receiving reported information of the ports, the main control board first queries the slice to which the ports belong, and then forwards the information to the corresponding ordinary slice VNDx to which resources belong through the management slice VND0. When information of the ordinary slice VNDx of the main control is sent, adaptive processing needs to be added to the main control board to forward the information of the ordinary slice VNDx to the management slice VND0, and then the information interaction between the management slice of the main control and the management slice equivalent to the line card is implemented. The line card has no need to sense the existence of a multi-slice entity of the main control.

For a line card that cannot create a multi-slice instance, when this type of line card is allocated to the ordinary slice VNDx of the main control board in a board-level mode, although a single-slice entity of the line card is physically equivalent to the management slice VND0, the line card has logically belonged to the ordinary slice VNDx. In this case, each module of the line card software has no need to sense the existence of the multi-slice entity of the main control in principle. In order to be compatible with the interaction need of each module (the global and systematic message exchange of the line card still needs to interact with the management slice VND0 of the main control, but a service module on the line card needs to interact with the slice VNDx to which the main control belongs), an interface for obtaining information of the current slice where the line card resides is provided. Physical slice information or logical slice information can be obtained via the interface. A module sensitive to the multi-slice entity of the main control needs to use the interface for obtaining the physical slice information for message exchange, and a module insensitive to the multi-slice entity of the main control needs to use the interface for obtaining the logical slice information for message exchange.

When the resource of the line card belongs to the ordinary slice VNDx, a communication scheme of the main control board and the original virtualization single-slice system of the line card needs to be simply adapted, for example, data needs to be identified and sent to a specified slice, and cross-process communication between the ordinary slice and the management slice needs to be added. Therefore, for the interaction between the slices, if necessary, the original function interface invoking relationship needs to be transformed into inter-process invoking between the slices.

As one of the core modules of system control, the main function of board and card management is to manage and control various hardware resources in the system, monitor a state change of the hardware resources in real time, provide a reliable hardware resource state for an upper-layer service, and provide reliable data for users to learn the running state of the system. The board and card management is simply the maintenance of a board state controlled by the system. When the board state is maintained according to the actual running state of the board, users can judge a service state through the state of the board, for example, if the board is in INSERVICE, it may be preliminarily judged that the service is in a normal state.

As shown in Table 1, there may be the following board states as required.

TABLE 1

| State name | State meaning |
| --- | --- |
| UNKNOWN | Initial state |
| OFFLINE | Hardware is offline, that is, there is no board plugged in the slot or hardware is in bad contact |
| HWONLINE | Hardware is online, that is, there is a board plugged in the slot, but software is not running normally |
| TYPEMISMATCH | The type configured by users does not match the actual type of the board |
| CONFIGING | Service is being configured |
| INSERVICE | Service is configured, and the board has entered a normal working state |
| STANDBY | A standby main control board is in a normal working state |
| POWERSAVE | The board is in a power-saving state |

After the system supports multiple slices, the resource of the board is no longer statically bound in the management slice VND0, but needs to be dynamically allocated to the ordinary slice VNDx, so the board state belonging to the slice needs to be maintained in a ordinary slice VNDx system, and a board slice-level state needs to be added to the original board state management structure. HWONLINE/OFFLINE of the board slice-level state is still determined by board scanning in the management slice VND0. Whether the board scanning is in or out of position, except setting a board-level board state as HWONLINE/OFFLINE, the management slice VND0 also needs to set a slice-level state in the ordinary slice VNDx to which the board belongs as HWONLINE/OFFLINE according to the slice to which the resource of the board belongs. In addition, a keep-alive heartbeat signal between the line card and the main control will also affect the board state. The transition of a CONFIGING state at board slice-level is triggered by a CARDUP (board online) message in the ordinary slice VNDx of the main control, at the same time, after a service in the ordinary slice VNDx receives the CARDUP message from the system, service configuration is performed. After the service configuration is validated, a system board and card management module in the ordinary slice VNDx is notified to refresh the board slice-level state of the board in the ordinary slice VNDx to an INSERVICE state. To sum up, if the resource of the board belongs to the ordinary slice VNDx, when the transition of a physical state of the board is involved, the slice-level state of the board keeps synchronized with the board-level sate of the board in the management slice; when the transition of an effective state of the board is involved, the slice-level state of the board completely depends on the actual effectiveness of the service in the slice to which the board belongs. The processing flow is completely consistent with that of the management slice VND0, and is completely reused.

After the virtualization multi-slice system is supported, alarm management needs to be appropriately adapted. The slices have their respective alarm management modules and alarm management pools, so alarm functions are separate. The resource limited line card needs to send an alarm to the corresponding slice to which the main control belongs, note that the sending of an alarm to a wrong slice should be avoided.

By default, all resources of the system belong to the management slice VND0. After the ordinary slice VNDx is created, the resources may be allocated to the ordinary slice VNDx. For the slice allocation in a board or port exclusive mode, a resource is allocated from the management slice VND0 to a certain ordinary slice VNDx, and the management slice VND0 no longer has the resource. For the slices in a port sharing mode, the management slice VND0 and the ordinary slice VNDx own the port at the same time. When a resource is reclaimed from the ordinary slice VNDx, for the board mode and the port exclusive mode, the resource is directly returned from the ordinary slice VNDx to the management slice VND0, that is, the resource is added to the management slice VND0, and the resource is deleted from the ordinary slice VNDx. For the reclaiming in the port sharing mode, it is only needed to delete the resource from the ordinary slice VNDx. There is no need to add the resource to the management slice VND0, but it is only needed to change the allocation of the resource from the port sharing mode to the port exclusive mode.

In the case of multiple slices, on the one hand, when adding a board, the system not only adds board information to the default management slice VND0 to which the board belongs, but also adds the records of all physical ports under the board to the default management slice VND0 to which the board belongs. In this way, board and port resources under the management slice VND0 will be taken as the basis for the subsequent allocatable resource management of the ordinary slice VNDx. On the other hand, when deleting a board, in addition to deleting the record of the board under the management slice VND0, the system also needs to delete the added records of all the physical ports of the board. When the board is queried under each ordinary slice VNDx, it is needed to filter based on the VND ID of the ordinary slice, and only the resource belonging to the slice is presented. For a plug-and-play board, after the actual board type is detected, the board is processed according to the above operation process for adding a board.

Specific rules for system resource allocation may include the following four types.

In the first type, a resource is allocated according to a service board, in this case, the slice will monopolize the allocated service board, and objects such as a port and an Optical Network Terminal (ONT) under the service board belong to the corresponding ordinary slice VNDx system. It is to be noted that, under the ordinary slice VNDx, the allocated board may be reset, the board state of the allocated board may be checked, and a board alarm for the allocated board may be reported. Because the management slice VND0 has the maximum management permission, under the management slice VND0, the board may also be deleted and reset, the board state may also be checked, and the board alarm may also be reported.

In the second type, a resource is allocated according to a physical port exclusive mode, in this case, the slice will monopolize the obtained port. Different ports may be divided into different slices. In this scenario, the physical ports on the same board are allowed to belong to different slices, that is, the bounding is performed one by one according to a granularity of port. Under the slice to which a port belongs, related configuration management, port state query and other operations may be performed to the port.

In the third type, a resource is allocated according to a physical port sharing mode, and a physical port is allocated to multiple slices simultaneously, in this case, the multiple slices own the physical port. For example, a PON port is allocated to multiple slices simultaneously, so the ONU obtained by each slice is different. In this way, different users under a PON interface may belong to different virtual slice systems.

In the fourth type, a resource is allocated according to a service sub-interface of the physical port, and a service virtual sub-interface configured under the ONU created by the management slice VND0 is allocated to multiple virtual OLT slice systems. In this way, different service flows in the same ONT may belong to different virtual slice systems, and are managed using the virtual system based on the service flow, providing users with more flexible choices.

A physical object may be bound to the virtual slice system in different granularities. According to the allocation mode, each virtual OLT slice forms an independent and complete virtual OLT system after obtaining the allocated system resources, that is, each virtual OLT slice has the functions of a complete OLT device, which is equivalent to obtaining multiple available OLT devices that can meet various service requirements from one OLT device by means of reasonable resource allocation.

After multiple slices are supported, because the ordinary slice VNDx and the management slice VND0 have unequal management permissions, the management slice VND0 has all management permissions involved, but the management permission of the ordinary slice VNDx needs to be restricted. In order to manage a user-side resource under the ordinary slice VNDx, the following slice configuration modes are supported.

The first slice configuration mode is a board-level slice mode. After the ordinary slice VNDx is set to this slice mode, the resource allocation for the slice is limited to the resource allocation at a board-level granularity, and it is not allowed to allocate the resource to the slice at the port-level granularity and other granularities.

The second slice configuration mode is an exclusive-port-level slice mode. After the ordinary slice VNDx is set to this slice mode, the resource allocation for the slice is limited to the resource allocation at a port-level granularity in an exclusive mode, and it is not allowed to allocate the resource to the slice at the board-level and port-level granularities in other modes. Allocating an exclusive port to the slice means that after the port is allocated to the ordinary slice VNDx by the management slice VND0, the resource of the port will completely belong to the ordinary slice VNDx, and will not belong to the management slice VND0.

The third slice configuration mode is a sharing-port-level slice mode. After the ordinary slice VNDx is set to this slice mode, the resource allocation for the slice is limited to the resource allocation at a port-level granularity in a sharing mode, and it is not allowed to allocate the resource to the slice at the board-level and port-level granularities in other modes. Allocating a sharing port to the slice means that after the port is allocated to the ordinary slice VNDx by the management slice VND0, the resource of the port will not only belong to the ordinary slice VNDx, but still belong to the management slice VND0. For the port allocation in this sharing mode, the management slice VND0 has no need to sense the change of ownership of the port, if necessary, it only needs to sense the change of configuration mode of the port (the port changes from exclusively belonging to the VND0 to being shared by the VND0). In addition, all kinds of statistics related to the port do not change in the management slice VND0.

The fourth slice configuration mode is a mixed slice mode. This slice mode is a default slice mode of the ordinary slice VNDx and the management slice VND0. In this slice mode, the allocation of resource to the slice is not limited.

The above description of control over the slice is the processing to the ordinary slice VNDx by default, and it is required that the default slice mode is the mixed slice mode after the ordinary slice VNDx is created. By adding a slice mode switching command, the slice mode of the ordinary slice VNDx may be switched under a certain condition.

Due to different granularities and different modes existing in the resource allocation, there are two ways to implement resource allocation constraint for the sake of operation friendliness and implementation convenience. In the first way, when resource allocation is selected from a command interface, resource allocation is directly limited, and when a resource allocation command is executed, the unsupported resource granularity is filtered out and only the supported resource granularity is presented. In the second way, if the resource granularities allocated in some scenarios cannot be filtered out accurately, there is a compromise way, that is, when the resource allocation command is issued, a resource check control is added before the resource allocation command is actually executed, and a failure response is returned for the resource allocation that does not satisfy or meet a constraint condition, at the same time, an instructive error prompt is given to remind users.

Specific constraint rules of resource allocation may include at least one of the following.

In a board slice mode, only the resource allocation at the board-level granularity is supported, and the resource allocation at other granularities is not supported.

In an exclusive port slice mode, only the allocation of port in an exclusive allocation mode is supported, and the allocation of resource in other modes is not supported.

In a sharing port slice mode, only the allocation of port in a sharing allocation mode is supported, and the allocation of resource in other modes is not supported (when a port is allocated, there should be explicit feature specification to distinguish configuration modes).

When the slice mode is switched, the slice in the mixed mode may be arbitrarily switched to other slice modes.

When the slice mode is switched, the slice in the board mode may be arbitrarily switched to other slice modes if there is no resource to be allocated, and can only be switched to the mixed mode if there are resources.

When the slice mode is switched, the slice in the exclusive port mode may be arbitrarily switched to other slice modes if there is no resource to be allocated, and can only be switched to the mixed mode if there are resources.

When the slice mode is switched, the slice in the sharing port mode may be arbitrarily switched to other slice modes if there is no resource to be allocated, and can only be switched to the mixed mode if there are resources.

Because memory resources of the board are also limited and the startup of each slice process instance consumes a certain system memory, the number of slices that can be created is also limited, at the same time, if too many slices are started to exceed the range of board memory, Out Of Memory (OOM) is triggered to cause system reset. Therefore, it is needed to judge the capacity of the slice during the creation of the slice. When the maximum number supported by the system is reached, it is not allowed to create new slices. Specific judgment conditions include but are not limited to memory resources. The timing of limit is when the slices are created on the main control board, without depending on whether a slice entity process is actually started, because to ensure the successful configuration of the number of slices, it must be successfully started.

After the original software system virtualizes multiple slices, the management of resource templates needs to be centrally controlled in the management slice VND0. The management slice VND0 manages and controls the creation, deletion, modification, and query of the resource templates of both the management slice VND0 and the ordinary slice VNDx, and other ordinary slice VNDx can only control the corresponding service configuration according to a capacity indicator configured by the management slice VND0.

Second Embodiment

Figure 2:
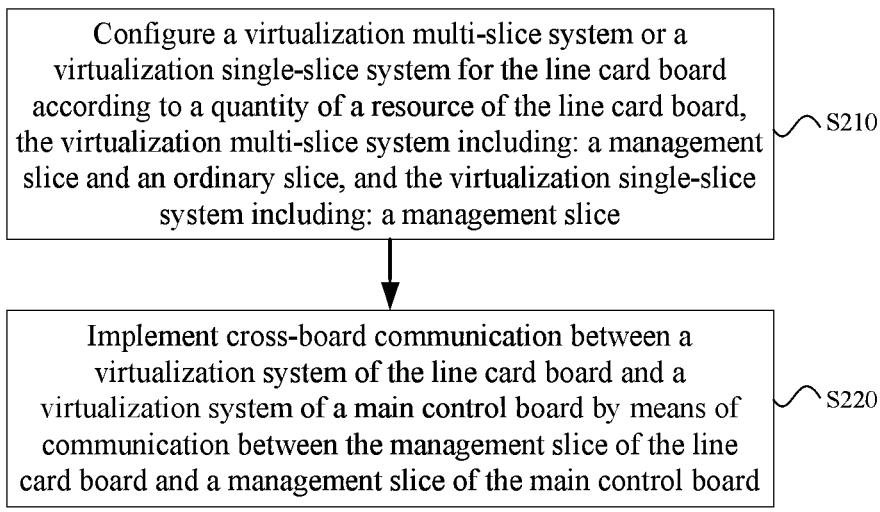
FIG. 2 is a flowchart of a virtualization method (applied in a line card board) according to a second embodiment of the present disclosure.

As shown in FIG. 2, the embodiments of the present disclosure provide a virtualization method, which is applied to a line card board, and includes the following operations.

At S210, a virtualization multi-slice system or a virtualization single-slice system is configured for the line card board according to a quantity of a resource of the line card board, the virtualization multi-slice system including: a management slice and an ordinary slice, and the virtualization single-slice system including: a management slice.

At S220, cross-board communication between a virtualization system of the line card board and a virtualization system of a main control board is implemented by means of communication between the management slice of the line card board and a management slice of the main control board.

In an implementation, the operation that the virtualization multi-slice system or the virtualization single-slice system is configured for the line card board according to the quantity of the resource of the line card board may include that: in a case where the quantity of resource of the line card board is sufficient, the virtualization multi-slice system is configured for the line card board; in a case where the quantity of resource of the line card board is limited, the virtualization single-slice system is configured for the line card board. In an implementation, the resource of the line card board is allocated to the management slice or the ordinary slice of the main control board at the board-level granularity; or the resource of the line card board is allocated to the management slice or the ordinary slice of the main control board at the port-level granularity and in the port exclusive mode; or the resource of the line card board is allocated to the management slice and the ordinary slice of the main control board at the port-level granularity and in the port sharing mode.

In an implementation, after the resource of the line card board is allocated to the ordinary slice of the main control board, in a case where the virtualization single-slice system is configured for the line card board, data is sent to the management slice of the main control board through the management slice of the line card board.

In an implementation, after the resource of the line card board is allocated to the ordinary slice of the main control board, in a case where the virtualization multi-slice system is configured for the line card board, data which carries identifier information of the ordinary slice of the line card board is sent to the management slice of the main control board through the management slice of the line card board. The ordinary slice of the line card board has a one-to-one correspondence with the ordinary slice of the main control board.

In an implementation, the operation that the cross-board communication between the virtualization system of the main control board and the virtualization system of the line card board is implemented by means of the communication between the management slice of the main control board and the management slice of the line card board may include that: in a case where a virtualization multi-slice system is configured for the line card board, the management slice of the line card board receives the data forwarded by the management slice of the main control board, and in a case where the data actually belongs to the management slice of the line card board, the data is processed by the management slice of the line card board; in a case where the data actually belongs to the ordinary slice of the line card board, the data is forwarded by the management slice of the line card board to the ordinary slice of the line card board for processing; and in a case where a virtualization single-slice system is configured for the line card board, the management slice of the line card board receives and processes the data forwarded by the management slice of the main control board.

Third Embodiment

Figure 3:
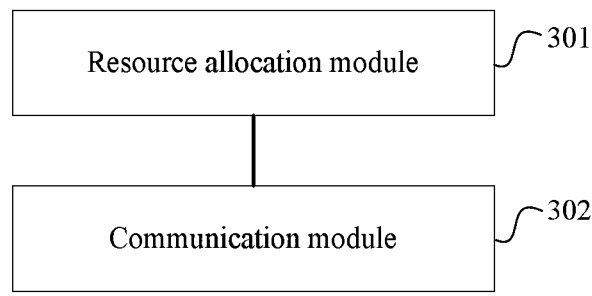
FIG. 3 is a schematic diagram of a virtualization apparatus (applied in a main control board) according to a third embodiment of the present disclosure.

As shown in FIG. 3, the embodiments of the present disclosure provide a virtualization apparatus, which is applied to a main control board and includes: a resource allocation module 301, configured to allocate a resource of a line card board to a slice of a virtualization system of the main control board, the slice including: a management slice and/or an ordinary slice; and a communication module 302, configured to implement cross-board communication between the virtualization system of the main control board and a virtualization system of the line card board by means of the communication between the management slice of the main control board and a management slice of the line card board.

In an implementation, the resource allocation module 301 is configured to allocate the resource of the line card board to the slice of the virtualization system of the main control board in the following way:

the resource of the line card board is allocated to the management slice or the ordinary slice of the main control board at a board-level granularity; or the resource of the line card board is allocated to the management slice or the ordinary slice of the main control board at a port-level granularity and in a port exclusive mode; or the resource of the line card board is allocated to the management slice and the ordinary slice of the main control board at a port-level granularity and in a port sharing mode.

In an implementation, the communication module 302 is configured to implement the cross-board communication between the virtualization system of the main control board and a virtualization system of the line card board by means of the communication between the management slice of the main control board and a management slice of the line card board in the following way:

after the resource of the line card board is allocated to the ordinary slice of the main control board, data is forwarded between the ordinary slice of the main control board and the virtualization system of the line card board by using the management slice of the main control board as a communication proxy of the virtualization system of the main control board.

In an implementation, the communication module 302 is configured to forward data between the ordinary slice of the main control board and the virtualization system of the line card board by using the management slice of the main control board as the communication proxy of the virtualization system of the main control board in the following way:

after the management slice of the main control board receives data from the virtualization system of the line card board, in a case where the data carries the identifier information of the ordinary slice of the line card board, the data is forwarded to the ordinary slice of the main control board corresponding to the ordinary slice of the line card board.

In the implementation, a virtualization multi-slice system is configured for the line card board. The virtualization multi-slice system includes: a management slice and an ordinary slice. The ordinary slice of the line card board has a one-to-one correspondence with the ordinary slice of the main control board.

In an implementation, the communication module 302 is configured to forward data between the ordinary slice of the main control board and the virtualization system of the line card board by using the management slice of the main control board as the communication proxy of the virtualization system of the main control board in the following way:

after the management slice of the main control board receives data from the virtualization system of the line card board, in a case where the data carries the identifier information of the management slice of the line card board, a resource allocation granularity of the line card board is queried; and in a case where the resource allocation granularity of the line card board is the board-level granularity, the ordinary slice of the main control board to which the line card board belongs is determined, and the data is forwarded to the ordinary slice of the main control board; in a case where the resource allocation granularity of the line card board is the port-level granularity, the ordinary slice of the main control board to which a line card port belongs is determined, and the data is forwarded to the ordinary slice of the main control board.

In an implementation, the communication module 302 is configured to forward data between the ordinary slice of the main control board and the virtualization system of the line card board by using the management slice of the main control board as the communication proxy of the virtualization system of the main control board in the following way:

the ordinary slice of the main control board sends to-be-sent data which is sent to the line card board to the management slice of the main control board; and in a case where a virtualization multi-slice system is configured for the line card board, the management slice of the main control board sends the to-be-sent data to the management slice of the line card board; in a case where a virtualization single-slice system is configured for the line card board, the management slice of the main control board changes the slice to which the to-be-sent data belongs to the management slice of the line card board, and sends the to-be-sent data to the management slice of the line card board.

In an implementation, the virtualization apparatus may also include: a state management module 303.

The state management module 303 is configured for the management slice of the main control board to maintain state information of the line card board and synchronize the state information of the line card board to the ordinary slice, to which the resource of the line card board belongs, of the main control board.

Fourth Embodiment

Figure 4:
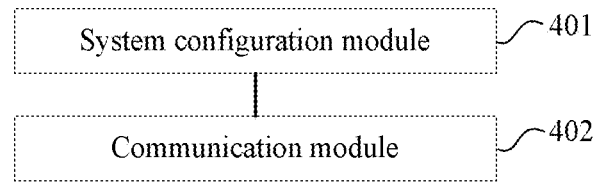
FIG. 4 is a schematic diagram of a virtualization apparatus (applied in a line card board) according to a fourth embodiment of the present disclosure.

As shown in FIG. 4, the embodiments of the present disclosure provide a virtualization apparatus, which is applied to a line card board, and includes: a system configuration module 401 and a communication module 402.

The system configuration module 401 is configured to configure a virtualization multi-slice system or a virtualization single-slice system for the line card board according to a quantity of a resource of the line card board, the virtualization multi-slice system including: a management slice and an ordinary slice, and the virtualization single-slice system including: a management slice.

The communication module 402 is configured to implement cross-board communication between a virtualization system of the line card board and a virtualization system of a main control board by means of communication between the management slice of the line card board and a management slice of the main control board.

In an implementation, the system configuration module 401 is configured to configure the virtualization multi-slice system or the virtualization single-slice system for the line card board according to the quantity of the resource of the line card board in the following way: in a case where the quantity of resource of the line card board is sufficient, the virtualization multi-slice system is configured for the line card board; in a case where the quantity of resource of the line card board is limited, the virtualization single-slice system is configured for the line card board.

In an implementation, after the resource of the line card board is allocated to the ordinary slice of the main control board, in a case where the virtualization single-slice system is configured for the line card board, data is sent to the management slice of the main control board through the management slice of the line card board; in a case where the virtualization multi-slice system is configured for the line card board, data which carries the identifier information of the ordinary slice of the line card board is sent to the management slice of the main control board through the management slice of the line card board. The ordinary slice of the line card board has a one-to-one correspondence with the ordinary slice of the main control board.

In an implementation, the communication module 402 is configured to implement the cross-board communication between the virtualization system of the main control board and the virtualization system of the line card board by means of the communication between the management slice of the main control board and the management slice of the line card board in the following way: in a case where a virtualization multi-slice system is configured for the line card board, the management slice of the line card board receives the data forwarded by the management slice of the main control board, and in a case where the data actually belongs to the management slice of the line card board, the data is processed by the management slice of the line card board; in a case where the data actually belongs to the ordinary slice of the line card board, the data is forwarded by the management slice of the line card board to the ordinary slice of the line card board for processing; and in a case where a virtualization single-slice system is configured for the line card board, the management slice of the line card board receives and processes the data forwarded by the management slice of the main control board.

Fifth Embodiment

The embodiments of the present disclosure provide a virtualization apparatus, which includes:

a memory, a processor and a virtualization program which is stored in the memory and capable of running on the processor, wherein the virtualization program, when being executed by the processor, implements the operations of the virtualization method in the above first embodiment or second embodiment.

Sixth Embodiment

The embodiments of the present disclosure provide a computer-readable storage medium, in which a virtualization program is stored. The virtualization program, when being executed by the processor, implements the operations of the virtualization method in the above first embodiment or second embodiment.

The virtualization scheme of the present disclosure is further illustrated through examples 1 to 11.

Example 1

Figure 5:
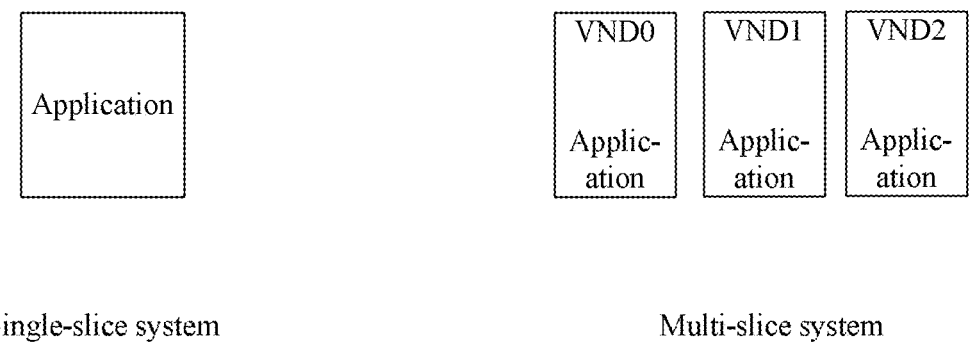
FIG. 5 is a schematic diagram that a main control board supports switching between a virtualization single-slice system and a virtualization multi-slice system in a first example.

As shown in FIG. 5, the main control board supports switching between the virtualization single-slice system and the virtualization multi-slice system. It is to be noted that, a logical slice may be either a single process or a group of multiple processes physically. For the sake of description, it is assumed that the virtualization single-slice system adopts a single-process mode by default.

On the premise of keeping the original software architecture form of the virtualization single-slice system unchanged, in order to support the virtualization multi-slice system, there is no need to change version construction, and a single process is still constructed. An image file of the single process serves both as an executable program of the management slice VND0 and as an executable program of the ordinary slice VNDx (x is equal to 1, 2, 3 . . . ), which is achieved by controlling and distinguishing through different startup parameters, such as a slice ID, when a process is created. In order to be compatible with the virtualization single-slice system, for the virtualization multi-slice system, the slice ID of the management slice is 0 by default when the management slice is started. When the ordinary slice VNDx is started, the slice ID specified by a specific user is taken as a control parameter of the startup of the slice. When initialization operation is started, the slices are distinguished according to the slice ID. In this way, multiple slices created exist in different slice modes logically. For the virtualization single-slice system, it is equivalent to starting a slice instance; for the virtualization multi-slice system, it is equivalent to starting multiple slice instances.

A system command is added. The system command is used for implementing switching between the virtualization single-slice system and the virtualization multi-slice system. The system command may be a dynamic configuration command. The system does not support the virtualization multi-slice system by default. After manually configuring and opening the system command, a user saves the configuration and restarts the system, and then the system is switched to the virtualization multi-slice system. If the user wants to switch to the virtualization single-slice system, the user needs to close the system command dynamically, saves the configuration and restarts the system, and then the system is switched to the virtualization single-slice system. A management slice VND0 process of the virtualization multi-slice system may be compatible with the single process of the virtualization single-slice system in configuration files.

The slice instance of the virtualization single-slice system and the slice instance of an OLT multi-slice system may be the same image file, which is constructed with the same code and the same version. However, there are still differences in the actual module processing between the management slice and the ordinary slice. For this problem, the ownership of software modules in the OLT system can be set clearly, for example, the software modules insensitive to slice information, such as OAM, protocol stacks, broadband services, and PON services, may be transformed (for example, the initial start of these modules has no need to distinguish the slices), and each software module may belong to multiple slices. Data, management messages and protocol messages among different slices of these software modules isolate from each other, and are achieved basically the same under both the management slice VND0 and the ordinary slice VNDx. The software modules that cannot be transformed into the multi-slice instance may directly belong to the management slice VND0 and be initialized, in this case, the data of such modules can only be a global copy. In addition, slice VND ID information may be added to distinguish the data interaction between a service module in other ordinary slices and a global module in the management slice.

In the virtualization multi-slice system, each slice has its own independent file system. The file system of the slice may be created during the running of the system. A slice directory is named according to a certain naming rule (for example, the management slice: \flash\VND0\, the ordinary slice 1: \flash\VND1\, the ordinary slice 2: \flash\VND2\). The file system of each slice includes, but not limited to: a configuration file, an ONU file, etc. The file systems between the ordinary slices VNDx cannot be operated each other. The ordinary slice VNDx can only manage its own file system, but the management slice VND0 can operate and manage the file systems of all the slices.

Example 2

Figure 6:
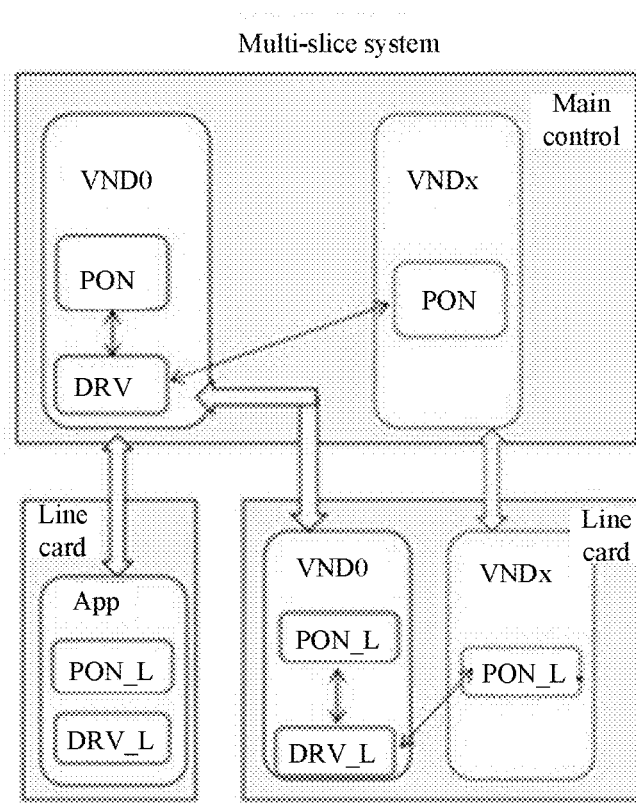
FIG. 6 is a schematic diagram that a line card with sufficient resources supports board-level resource allocation in a second example.

As shown in FIG. 6, when the resource of the line card is sufficient, the line card may support the virtualization multi-slice system. After the resource of the line card is allocated to the slice, the line card will start the corresponding slice instance, a slice process entity created by the line card only includes a part of service modules insensitive to the slice, and a global module is still created in the management slice VND0 of the line card; in this case, services of the line card at different ordinary slices are completely isolated, and in terms of service implementation, it may be regarded as cloning a logical slice instance. At the same time, the service module in the slice process entity of the line card needs to access the global module through the data interaction between the processes.

Example 3

Figure 7:
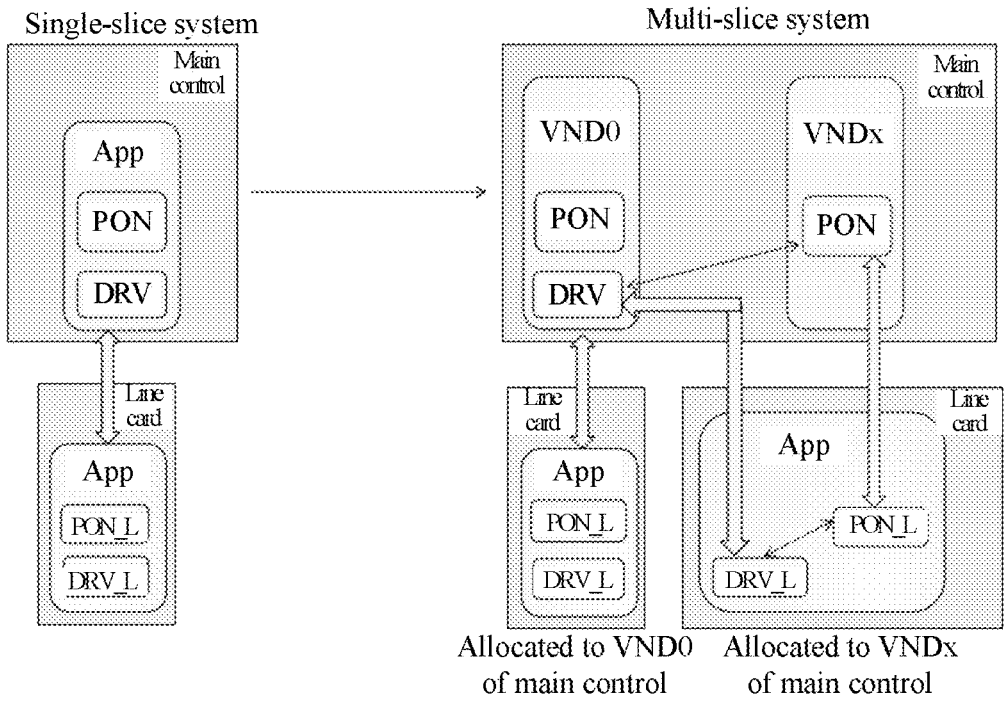
FIG. 7 is a schematic diagram that a line card with limited resources supports board-level resource allocation in a third example.

As shown in FIG. 7, when the resource of the line card is limited, the line card can only support the virtualization single-slice system. Due to resource constraints such as memory and hardware of the line card with limited resources, the starting of the multi-slice entity cannot be supported on the board, but the single pate may be adapted to support slice allocation.

When the line card with limited resources is allocated to the ordinary slice in the board-level mode, all logical services of the board need to be processed in the corresponding ordinary slice domain. In terms of services, it is regarded that the line card belongs to the ordinary slice and no longer belongs to the management slice, but a physical entity process of the line card still runs as the management slice VND0.

In principle, each service module of the line card software has no need to sense the existence of the multi-slice entity, and only needs to interact with an object in the same slice domain. However, the service module obtains hardware resources and implements the cross-board communication physically through the global and systematic hardware and communication module of the line card, it is needed to be compatible with implementing message exchange adaption between the virtualization multi-slice system of the main control and the virtualization single-slice system of the line card (the global and systematic message exchange of the line card still needs to interact with the management slice VND0 of the main control, but the service module on the line card needs to interact with the slice VNDx to which the main control belongs), and an interface for obtaining physical slice information is provided to be applied to the global and systematic module of the line card. This type of module is sensitive to the slice and needs to physically identify its own interaction object, and the physical slice information must be obtained; in this scenario, the physical slice information obtained is the management slice VND0. The interface for obtaining logical slice information is provided to be applied to service modules, such as PON. This type of module is insensitive to the slice and has no need to care about the slice where it is; in this scenario, the logical slice information obtained by the service module is the ordinary slice VNDx. After such processing, although the whole board is allocated with the ordinary slice, and processing in the slice domain is implemented on the logical processing of the line card, but the global module of the line card still physically interacts with the management slice VND0 of the main control.

Because the cross-board interaction of the service module of the line card needs to interact with the module in the logical slice domain, the cross-board interaction of the global control information of the line card still needs to interact with the management slice VND0 of the main control board. In this way, when a message is sent on the line card, it is needed to carry the specified destination slice ID; when the main control board receives a line card message, no additional processing is required, and the message is directly forwarded by the management slice VND0 of the main control to the corresponding slice for processing according to the slice information carried by the message. When a main control message is sent, it can only be the interaction within the slice domain when the modules on the management slice VND0 of the main control and the ordinary slice VNDx send a cross-board message, therefore, when the main control message is received on the line card, as the line card itself is a single entity process, all the messages from different slices received by the line card can be directly sent to the corresponding module of the current entity process for processing. After this processing, the unified physical entity of the line card is basically implemented to complete adaptation processing of different logic.

Example 4

Figure 8:
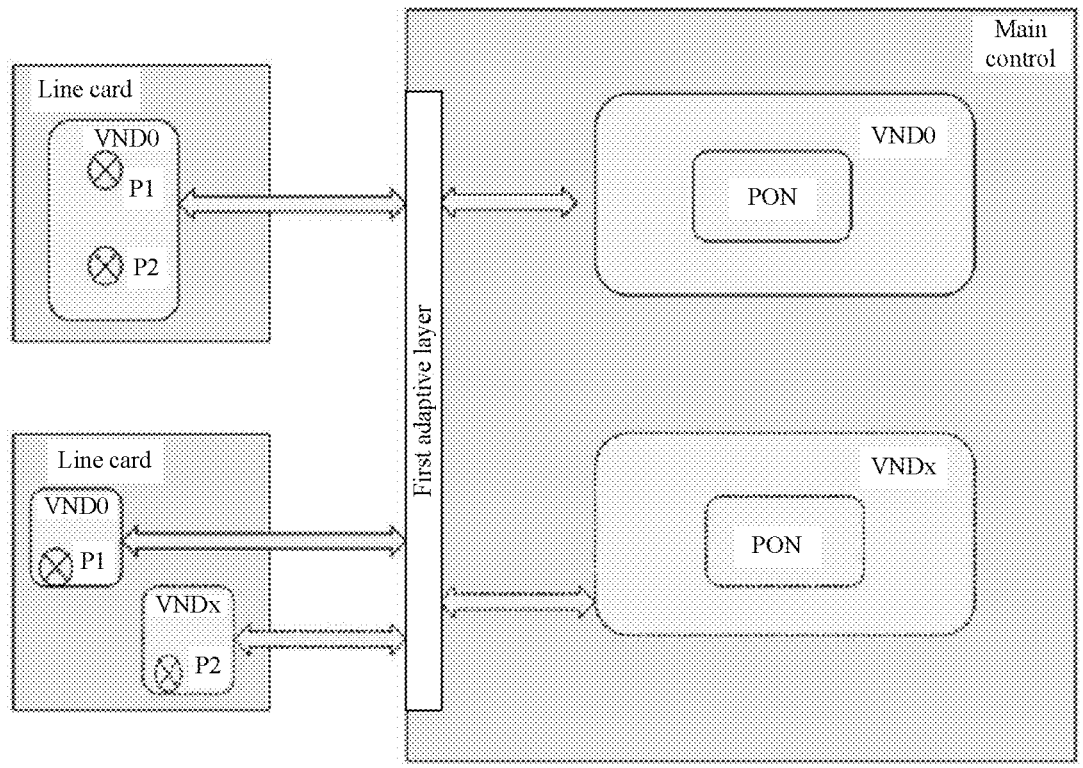
FIG. 8 is a schematic diagram that a line card with sufficient resources supports port exclusive resource allocation in a fourth example.

As shown in FIG. 8, when the resource of the line card is sufficient, the line card may support the virtualization multi-slice system. When the line card with sufficient resources is allocated to the ordinary slice in a port-level mode, a corresponding slice entity process will started on the line card. A processing module of the port belongs to the ordinary slice VNDx physically and logically. The actual adaptation process is to forward the information of the ordinary slice VNDx to the management slice VND0 through a first adaptation layer (communication adaptation layer), and to forward the message from the line card from the management slice VND0 to the ordinary slice VNDx through the first adaptation layer (communication adaptation layer).

When the line card side receives a multi-slice message from the main control, it can directly forward the message to the processing module of the corresponding port of the line card according to the slice information. When the main control side receives a message of the line card, it only forwards the message according to the specified slice. That is, when receiving the message of the line card, the main control board directly forwards the message exchange of the port resources of the line card if the port carries the ordinary slice information.

Example 5

Figure 9:
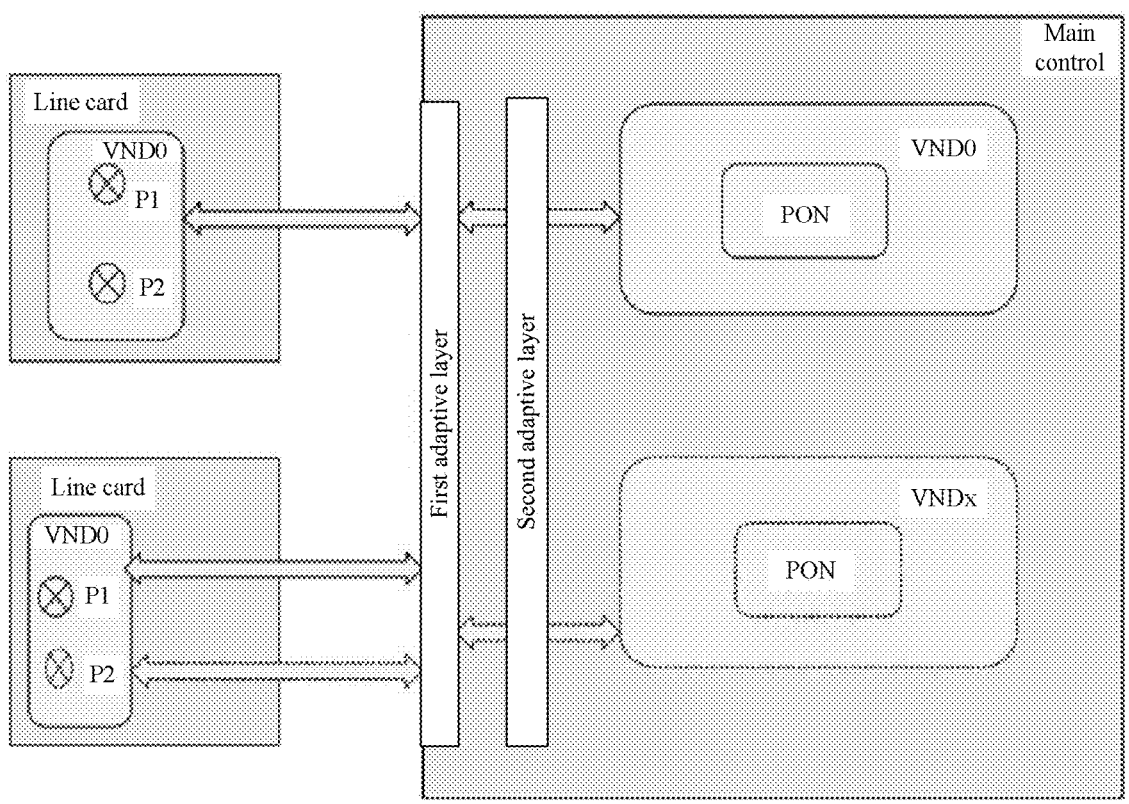
FIG. 9 is a schematic diagram that a line card with limited resources supports port exclusive resource allocation in a fifth example.

As shown in FIG. 9, when the resource of the line card is limited, the line card can only support the virtualization single-slice system. When the line card with limited resources is allocated to the ordinary slice in the port-level mode, the slice information physically or logically obtained by the global module and the service module on the line card with limited resources is still the management slice VND0.

When the line card with limited resources is allocated to the ordinary slice in the port-level mode, the board still belongs to the management slice VND0 physically and logically, but the port resource allocated to the slice belongs to the ordinary slice logically. After a part of ports of the line card are logically allocated to the ordinary slice VNDx, the information interaction between this type of port and the main control needs to be forwarded to the ordinary slice VNDx. When receiving the information reported by this type of port, the main control first queries the slice to which the port belongs based on a second adaptation layer (resource management adaptation layer), and then the management slice VND0 forwards the information to the corresponding ordinary slice VNDx to which the resource belongs to through the first adaptation layer (communication adaptation layer). When the information of the ordinary slice VNDx of the main control is sent, it is needed to add adaptation processing to the main control, so as to forward the information of the ordinary slice VNDx to the management slice VND0 through the first adaptation layer (communication adaptation layer), and then the information interaction between the management slice of the main control and the management slice of the line card is implemented. The line card does not need to sense the existence of the multi-slice entity of the main control.

When the main control board receives the information of the line card, for the message exchange of the port resources of the line card and the information of the management slice carried by the port, it is needed to further query the resource ownership of the port to perform adaptive forwarding.

Example 6

Figure 10:
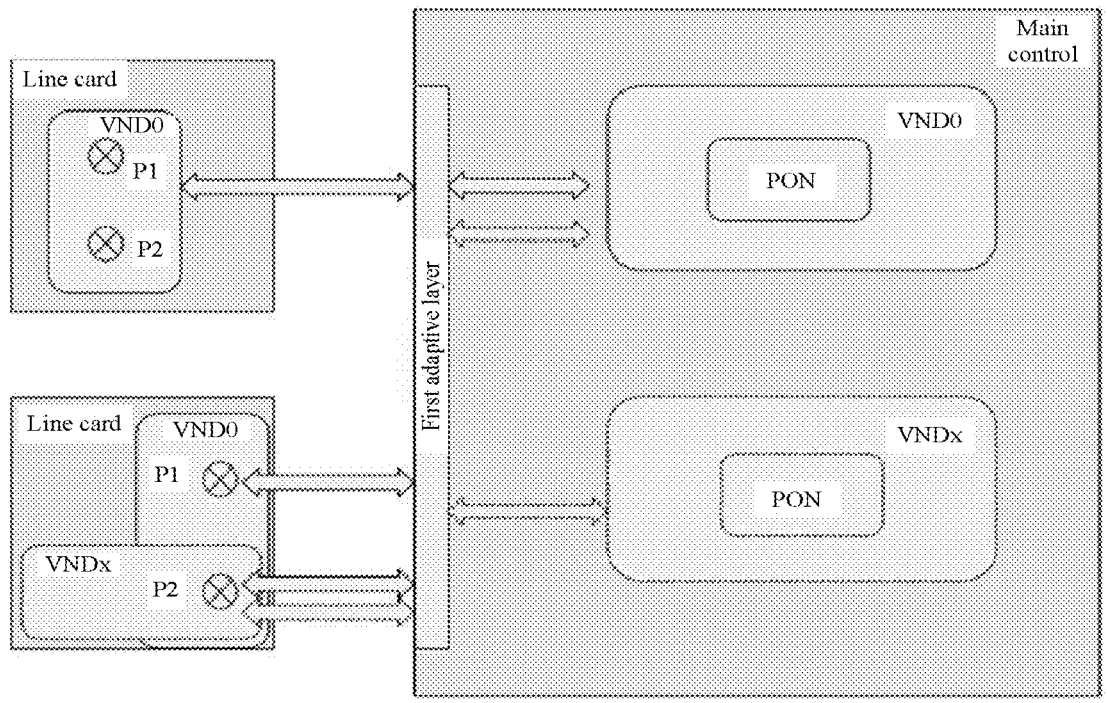
FIG. 10 is a schematic diagram that a line card with sufficient resources supports port sharing resource allocation in a sixth example.

FIG. 10 shows that the line card with sufficient resources is allocated to the ordinary slice in the port sharing mode. Taking a PON line card as an example, a physical port of the PON line card supports shared allocation, and this type of line card supports a multi-slice entity process. After a PON port of this type of line card completes the simultaneous allocation of multiple slices, it actually supports the implementation of an ONU-level slice. Because the ONU is a device configured under the PON physical port, when the PON belongs to the VND0, the ONU device configured under the PON port in the VND0 belongs to the VND0, and after the PON port is allowed to be shared with the VNDx, the ONU device configured under the shared PON port in the VNDx belongs to the VNDx. Because multiple ONU devices may be configured under a PON physical port, after such implementation, an ONU-level slice deployment is supported, that is, multiple ONU devices under a PON physical port may be flexibly configured in different slices based on actual needs, and the ONU device may completely belong to this slice and be transparent to other slices, including the management slices, thereby greatly enriching the flexibility of application configuration.

For the reclaiming of allocation of the port sharing mode, it is actually the operation of adding or deleting the port resource in the ordinary slice VNDx, but for the management slice VND0, the operation of adding or deleting is not needed, and it is only needed to change the allocation mode of the port resource under the management slice from the sharing mode to the exclusive mode. Compared with the allocation of the port exclusive mode, the actual operation is to delete the port resource in the management slice VND0, and then add the port resource in the ordinary slice VNDx, that is, by contrast, the reclaiming of port allocation of the exclusive mode is mutually exclusive between the management slice and the ordinary slice, but the port allocation of the sharing mode exists in both the management slice and the ordinary slice. However, after the port is allocated in the sharing mode, for each allocated slice, a task is still used exclusively logically.

Example 7

Figure 11:
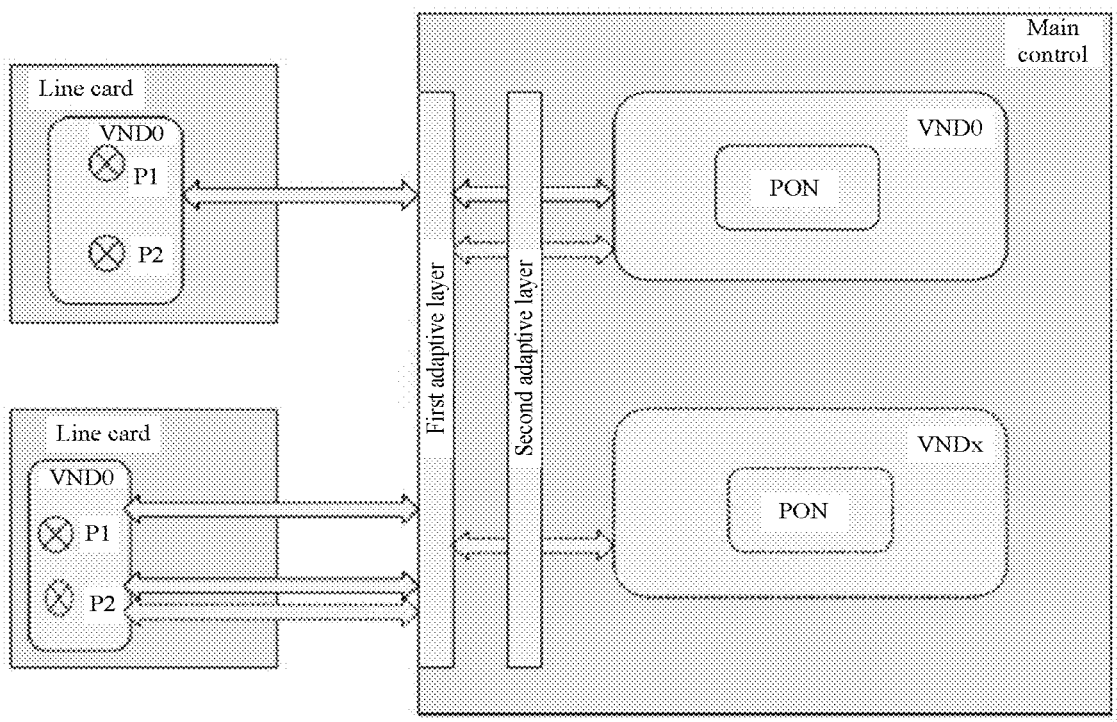
FIG. 11 is a schematic diagram that a line card with limited resources supports port sharing resource allocation in a seventh example.

FIG. 11 shows that the line card with limited resources is allocated to the ordinary slice in the port sharing mode. Taking an uplink board port with limited resources as an example, the uplink board port supports shared allocation to multiple slices. A physical uplink port logically supports access of multiple IP networks, which greatly saves the resource of the uplink port of the board and enhances system integration. There are two main differences between the shared allocation supported by the physical port of the line card with limited resources and the shared allocation supported by the physical port of the line card with sufficient resources, one of which is that the line card with limited resources is still the single entity process, and the other is that the interaction between the line card and the virtualization multi-slice system of the main control requires adaptation of the second adaptation layer (resource management adaptation layer) on the main control board. In addition, after the uplink port supports sharing, a device connected to the uplink port, after supporting end-to-end virtualization, may implement a physical uplink port by setting different Virtual Local Area Networks (VLAN) and other means when interacting through an uplink port forwarding flow, and at the same time, serve for multiple logical OLT slice systems.

For the reclaiming of allocation of the port sharing mode, it is actually the operation of adding or deleting the port resource in the ordinary slice VNDx, but for the management slice VND0, the operation of adding or deleting is not needed, and it is only needed to change the allocation mode of the port resource under the management slice from the sharing mode to the exclusive mode. Compared with the allocation of the port exclusive mode, the actual operation is to delete the port resource in the management slice VND0, and then add the port resource in the ordinary slice VNDx, that is, by contrast, the reclaiming of port allocation of the exclusive mode is mutually exclusive between the management slice and the ordinary slice, but the port allocation of the sharing mode exists in both the management slice and the ordinary slice. However, after the port is allocated in the sharing mode, for each allocated slice, a task is still used exclusively logically.

Example 8

Figure 12:
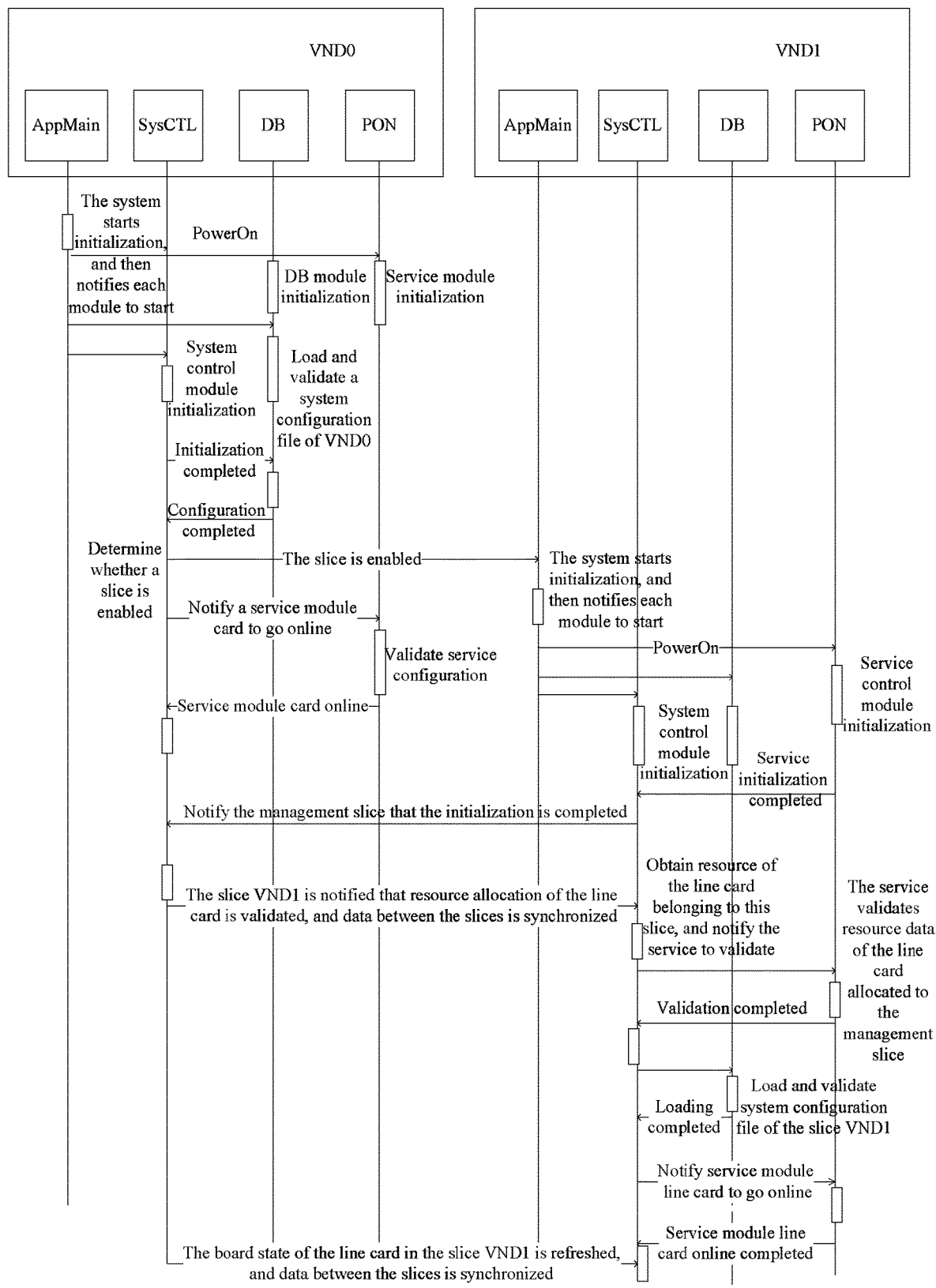
FIG. 12 is a schematic diagram of a starting time sequence of a management slice and an ordinary slice in an eighth example.

As shown in FIG. 12, in the virtualization multi-slice system, startup loading time sequences of the management slice VND0 and the ordinary slice VNDx on the main control board have a precedence relationship. The VND0 is started prior to the VNDx. multiple VNDx may be started concurrently, and the VND0 triggers the startup of the VNDx when the configuration file is loaded. The loading time sequence of the private configuration file of the VNDx is completed depending on the addition of the resource allocated to the slice VNDx to the service module, and the other processes are basically the same and may be implemented by reusing codes.

The AppMain module, mainly indicating the main entry of the slice entity process, serves as the main entry of starting the slice instance. The SysCtl module, mainly indicating a system control part in the slice entity process, is mainly configured to maintain, enable and control the global data of the board. The DB module, mainly indicating a database module in the slice entity process, is mainly configured to initialize the database of the slice entity, and load, enable and control the configuration file of the slice. The PON module, mainly indicating a general service module of the OLT system, does not specifically refer to the PON service, and mainly indicates a time sequence of enabling the data of the service module.

When the main control board is started, the management slice VND0 is started first (note that, in this example, the management slice VND0 not only has a slice function, but also bears carriers of some common modules). Another implementation may be that, the common module involving the board may be managed by a separate process or process entity (assumed to be a System Control (SC) entity), and the management slice VND0 also exists as a "ordinary slice", in this case, when the system starts, the SC entity starts first, and then the VND0 and the VNDx start concurrently. In principle, a configuration loading time sequence of the SC entity also follows the loading time sequence shown in FIG. 12. In addition, in the case of this architecture, the VND0 is different from the VNDx, because the VND0 still exists as the management entity of the slice VNDx. After the initial loading of the management slice VND0 is started, the loading of the ordinary slice VNDx is triggered, and whether the loading of the ordinary slice VNDx is triggered completely depends on a configuration command of the configuration module.

When the management slice VND0 of the main control is started, the default slice instance startup parameters do not carry a slice ID parameter. When the system starts, and there is no the slice ID parameter, the system sets the current slice as VND0 by default. After the management slice VND0 process is pulled up, a series of key modules of the board are initialized. After the initialization is completed, the key modules are notified to be powered on. After receiving the power-on notification, each key module performs its own private initialization. After the system control module (SysCtl module) is initialized, the DB module will be notified to start loading the configuration file of the current slice, and the configuration command will be distributed and enabled, in this case, if the slice command is involved, the system control module will receive a slice operation command and directly trigger to validate the slice command. After the DB module is loaded, the DB module notifies through a message the system control module that the loading is completed, after that, if there is a message indicating that the board starts to power on, the system control module notifies the PON service module to configure the board. After the service configuration is validated successfully, the system control module is responded, at this point, the system control module refreshes a board state and other information of the powered-on line card.

The management slice VND0 of the main control triggers the ordinary slice VNDx to start when starting loading the configuration, at this point, the ordinary slice VNDx process will be pulled up. A process image of the ordinary slice VNDx is the same as that of the management slice VND0, and the difference is that the slice carries different corresponding slice ID parameters when it is started. After the slice VNDx is started, the current slice context is the specified slice. There is a difference between the initialization starting part of the ordinary slice VNDx and that of the management slice, and the global and systematic data initialization is not involved (the global and systematic data is only initialized at the management slice). After completing the start of initialization, the slice VNDx will also notify the key module to be powered on. After receiving the power-on notification, each key module performs its own private initialization. After the PON service module completes initialization, it needs to notify the system control module. After receiving the completion of service initialization, the system control module of the VNDx will send a message indicating that the slice VNDx is started to the system control module of the management slice VND0. After refreshing the state, Process ID (PID) and other key information of the VNDx, the system control module of the VND0 identifies whether there is resource allocation at the VNDx slice. If there is the resource allocation, the system control module of the VND0 sends the resource allocated to the VNDx to the system control module of the slice VNDx, and the system control module of the VNDx obtains resource data allocated to this slice and first informs the PON service module of the VNDx to validate. After the PON service module is validated, the system control module of the VNDx is responded. After the system control module of the VNDx receives the response, the DB module of the VNDx is triggered to start loading the configuration file of the slice VNDx. After the DB module of the VNDx is loaded and the system control module of the VNDx is notified, if the board belonging to this slice is powered on, the system control module of the slice VNDx notifies the PON service module to be powered on. The service configures data of the slice VNDx for the line card, and after the configuration is completed, the service module notifies the system control module of the VNDx to refresh the state. There is message exchange existing between the system control module of the VNDx and the system control module of the management slice VND0, which facilitates consistent synchronization of data of the board resources between different slices.

The configuration of the slice VNDx slice is based on the physical resources allocated to this slice, therefore, before the configuration file of the slice VNDx is loaded, it is necessary to ensure that the service module first validates the physical resources allocated to this slice; otherwise, when there is no physical resource in the service module of the slice, configuring services directly fails.

Example 9

Figure 13:
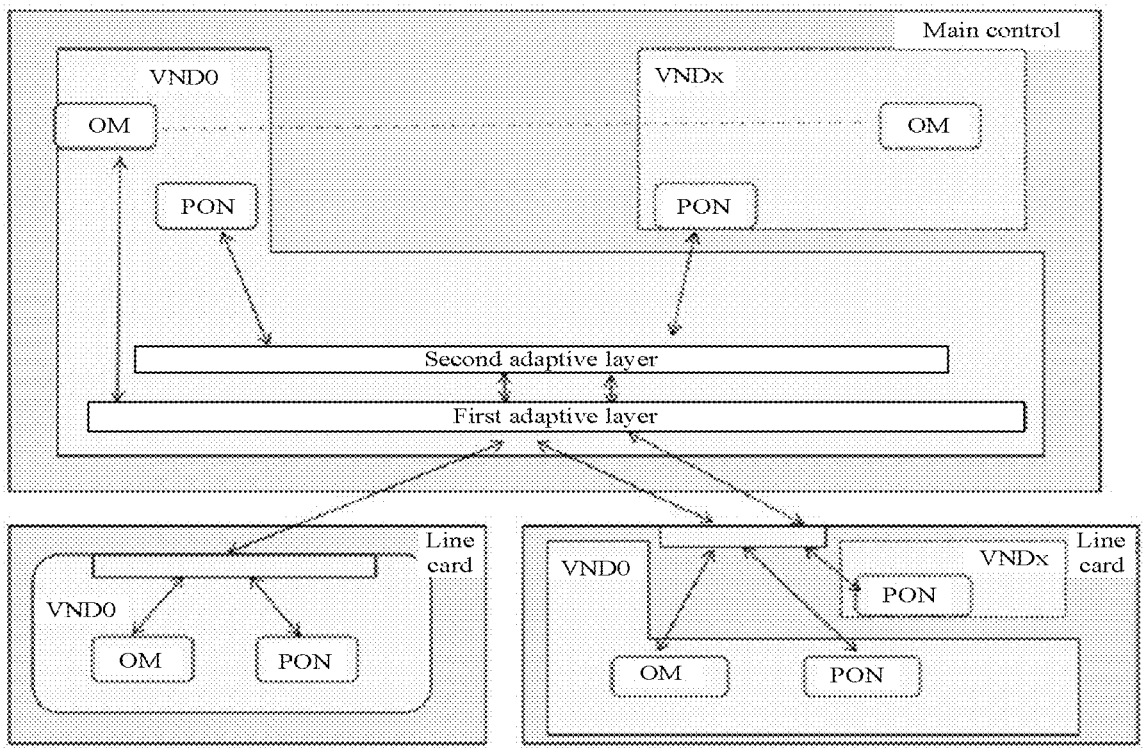
FIG. 13 is a schematic diagram of cross-board communication between a line card with sufficient resources and a main control board in a ninth example.
Figure 14:
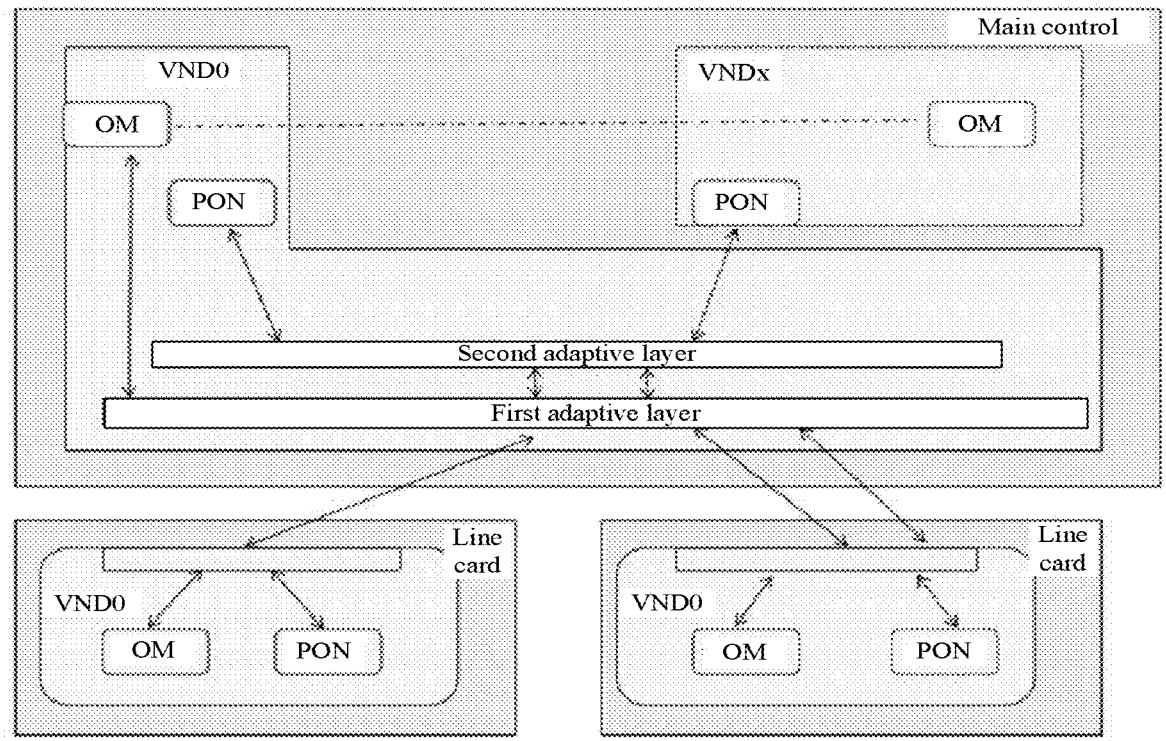
FIG. 14 is a schematic diagram of cross-board communication between a line card with limited resources and a main control board in a tenth example.

FIG. 13 shows that the line card with sufficient resources supports the virtualization multi-slice system, and the cross-board communication is performed between the line card and the main control board. FIG. 14 shows that the line card with limited resources only supports the virtualization single-slice system, and the cross-board communication is performed between the line card and the main control board.

The main difference between FIG. 13 and FIG. 14 is the difference of the line card. After the line card with limited resources is allocated to the slice VNDx, the line card is still the single entity process, but in this case, a communication domain of the module insensitive to the slice in the line card system will be switched to the VNDx, and the module sensitive to the slice will still interact with the main control VND0.

The main adaptation layer involving communication of the main control board mainly includes two parts. One part is the first adaptation layer (communication adaptation layer), which is mainly configured to, after the main control board receives a cross-board communication message, add identification of a destination slice of the message, and accurately forward the message to the destination slice. The other part is the second adaptation layer (resource management adaptation layer), which is mainly applied to a scenario of a non-board-level allocation slice (for example, a port-level allocation slice). For example, after the port resource of the line card with limited resources is allocated to a slice, the physical and logical slice ID of the line card with limited resources is still the VND0, but in this case, after a service flow involving the port is sent to the main control board, the main control board needs to further determine the slice to which the port belongs, and accurately forwards the message to the destination slice.

The common modules on the main control board, such as communication and Board Support Package (BSP), are currently placed in the management slice VND0. No matter whether the line card is the single entity process or the multi-slice entity process, the cross-board communication involved in the line card always interacts with the main control management slice VND0. If the line card is the multi-slice entity process, the cross-board communication message received by the line card is always processed in the management slice VND0 of the line card. The message received by the communication module of the VND0 process of the main control and the line card needs to identify the destination slice ID and forward the message to the corresponding slice entity process. On the one hand, processing like this considers both the virtualization single-slice system and the virtualization multi-slice system; on the other hand, by means of the existing communication protocol, only the communication between the slices is added, thereby quickly implementing the transformation of the existing architecture, reducing the difficulty of development and speeding up the development progress.

For the multi-slice entity process on the board, there is the cross-process communication between the management slice VND0 and the ordinary slice VNDx, and the cross-process communication between the ordinary slices VNDx is not supported. In addition, the cross-process communication must be limited in the communication domain of the slice in principle. For the cross-board communication that needs to be sent to a specified slice specially, in principle, only the communication interaction between the ordinary slice VNDx and the management slice VND0 is supported.

If there is the multi-slice instance on the board, data reading and writing requirements actually exist between the service module on the ordinary slice VNDx and the global data control module on the management slice VND0 of the board. In this case, the way for the module in the slice VNDx to obtain the global data of the board needs to be adjusted, the original function interface call relationship is transformed into the call between the slice processes. The specific way is not limited to synchronous or asynchronous message exchange.

After the OLT supports the virtualization multi-slice system, the communication modes involved mainly involve: a communication requirement between in-board slices, a communication requirement of inter-board slices, the selection of the communication protocol between the boards, etc. A cross-board communication protocol inherits the original communication protocol. Whether the cross-board communication protocol is received, sent and transferred by the management slice VND0 or the independent protocol stack of each cross-board slice is implemented is theoretically supported and may be achieved, and the specific selection of strategy may be comprehensively considered based on the progress of project requirements, hardware environment and other factors.

Example 10

Figure 15:
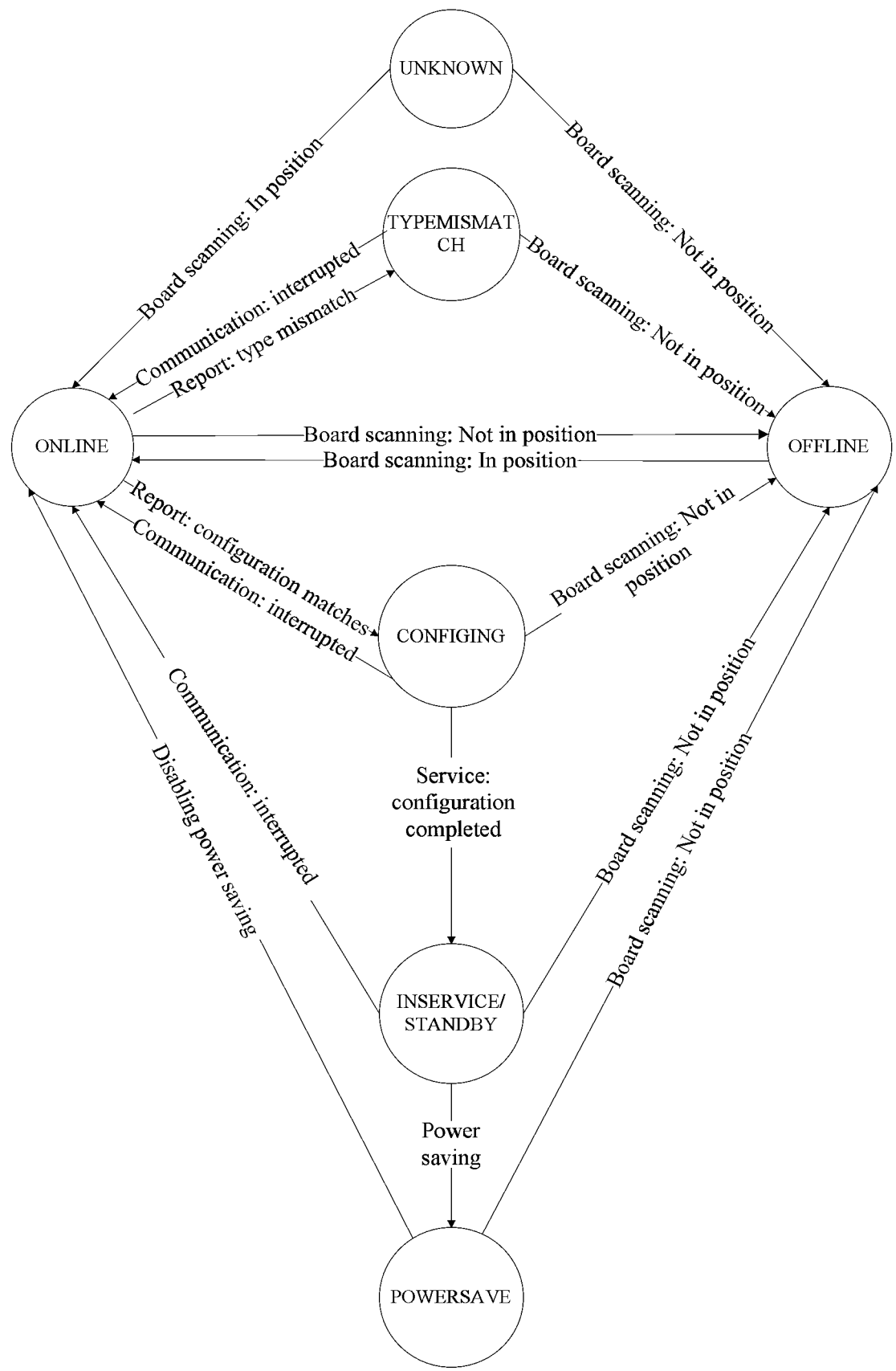
FIG. 15 is a schematic diagram of line card state management in an eleventh example.

FIG. 15 is a schematic diagram of line card state management. As shown in FIG. 15, several states of the line card and the transition driving are mainly described. Maintaining the state of the line card is to monitor a state change of hardware resources in real time and provide a reliable hardware resource state for the upper-layer service, thus providing a basis for users to know the running state of the system.

After system control is initialized, and before board scanning information is received, each slot enters an UNKNOWN state by default, indicating that the hardware state is not known, and at this point, no message exchange event or inter-board communication event is processed.

After a board scanning event of the board is processed, the state of the board is set to OFFLINE (the slot has no board plugged in) or HWONLINE (the slot has a board plugged in). When the state of the line card is HWONLINE, if the main control board receives a configuration request of the line card, and a target slot line card is not configured, the configuration request is ignored. If the target slot line card is configured, the main control board checks whether the configuration request of the line card is consistent with the configuration saved on the main control; if not, the state of the line card is set to TYPEMISMATCH; if so, configuration is sent to the line card, and the board enters the CONFIGING state. When the board enters the CONFIGING state, services need to be notified of the online state of the board. After a message indicating that the service configuration is completed is received, the state is set to INSERVICE (the state of a standby main control is set to STANDBY).

After the line card starts to a certain stage, the keep-alive heartbeat between the line card and the main control also influences the state of the board. The main influence is that: when the state of the line card is in the CONFIGING state, the INSERVICE (STANDBY) state, or the TYPEMISMATCH state, if the keep-alive heartbeat between the line card and the main control fails in handshake, the main control considers that the communication with the line card is abnormal (communication is interrupted), and the main control unconditionally transitions the state of the line card to the HWONLINE state.

In addition, the current system can also power off a specified board on line through a command. After a power-off command is executed on a certain line card, the state of the board is set to in the POWERSAVE state, in this case, the board is in a reset state.

After the virtualization multi-slice system is supported, the resource of the board is no longer statically bound in the management slice VND0, but may be dynamically allocated to the ordinary slice VNDx, so the board state belonging to the slice may be maintained in a ordinary slice VNDx system, and a board slice-level state needs to be added to the original board state management structure.

HWONLINE/OFFLINE of the board slice-level state is still determined by board scanning in the management slice VND0. Whether the board scanning is in or out of position, except setting a board-level board state as HWONLINE/OFFLINE, the management slice VND0 also needs to set a slice-level state in the ordinary slice VNDx to which the board belongs as HWONLINE/OFFLINE according to the slice to which the resource of the board belongs. The transition of the CONFIGING state at board slice-level is triggered by the CARDUP (power-on) message in the ordinary slice VNDx of the main control, at the same time, after a service in the ordinary slice VNDx receives the CARDUP message from the system, service configuration is performed. After the service configuration is validated, a system board and card management module in the ordinary slice VNDx is notified to refresh the board slice-level state of the board in the ordinary slice VNDx to an INSERVICE state.

When the line card with limited resources is allocated to the slice VNDx, because there is only the slice VND0 entity process, but no slice VNDx entity process, at this point, a management mode of the board state of the line card with limited resources in the VNDx cannot be implemented through the original mode, and it is needed to refresh the state of the line card in the slice VNDx while the resource of the line card with limited resources is allocated to the slice VNDx in the management slice VND0, and the state is reported by simulation to the system control module of the slice VNDx of the main control board according to the physical state of the line card in the VND0. The default board state of the line card with limited resources in the slice VNDx is still the UNKNOWN state. When the resource is allocated, and the physical states of the current line card are OFFLINE, ONLINE and TYPEMISMATCH, the board in the slice VNDx of the line card is directly set to the corresponding state. When the physical states of the current line card are CONFIGING and INSERVECE, the board in the slice VNDx of the line card is first set to the ONLINE state, and then the CARDUP message of the line card is reported by simulation to the system control module of the VNDx on the system control module of the VND0, and the system control module of the VNDx notifies the service of the VNDx to validate the configuration of the line card. After that, an validating result of the service module will directly influence the board state of the line card in the slice VNDx, and the subsequent state transition keeps consistent with the board state transition in the VND0.

If the resource of the board belongs to the ordinary slice VNDx, when the transition of the physical state of the board is involved, the slice-level state of the board keeps synchronized with the board-level sate of the board in the management slice; when the transition of the effective state of the board is involved, the slice-level state of the board completely depends on the actual effectiveness of the service in the slice to which the board belongs. The processing flow is completely consistent with that of the management slice VND0, and is completely reused.

What is claimed is:

1. A virtualization method, applied to a main control board, the virtualization method comprising:
    allocating a resource of a line card board to a slice of a virtualization system of the main control board, wherein the slice comprises: a management slice and/or an ordinary slice; and
    implementing cross-board communication between the virtualization system of the main control board and a virtualization system of the line card board by means of communication between the management slice of the main control board and a management slice of the line card board, wherein
    implementing cross-board communication between the virtualization system of the main control board and a virtualization system of the line card board by means of communication between the management slice of the main control board and a management slice of the line card board comprises:
    after allocating the resource of the line card board to the ordinary slice of the main control board, forwarding data between the ordinary slice of the main control board and the virtualization system of the line card board by using the management slice of the main control board as a communication proxy of the virtualization system of the main control board.

2. The virtualization method according to claim 1, wherein
    allocating a resource of a line card board to a slice of a virtualization system of the main control board comprises:
    allocating the resource of the line card board to the management slice or the ordinary slice of the main control board at a board-level granularity; or
    allocating the resource of the line card board to the management slice or the ordinary slice of the main control board at a port-level granularity and in a port exclusive mode; or allocating the resource of the line card board to the management slice and the ordinary slice of the main control board at a port-level granularity and in a port sharing mode.

3. The virtualization method according to claim 1, wherein
forwarding data between the ordinary slice of the main control board and the virtualization system of the line card board by using the management slice of the main control board as a communication proxy of the virtualization system of the main control board comprises:
after the management slice of the main control board receives data from the virtualization system of the line card board, in a case where the data carries identifier information of an ordinary slice of the line card board, forwarding the data to the ordinary slice of the main control board corresponding to the ordinary slice of the line card board;
wherein a virtualization multi-slice system is configured for the line card board; the virtualization multi-slice system comprises: the management slice and the ordinary slice; and the ordinary slice of the line card board has a one-to-one correspondence with the ordinary slice of the main control board.

4. The virtualization method according to claim 1, wherein
forwarding data between the ordinary slice of the main control board and the virtualization system of the line card board by using the management slice of the main control board as a communication proxy of the virtualization system of the main control board comprises:
after the management slice of the main control board receives data from the virtualization system of the line card board, in a case where the data carries identifier information of the management slice of the line card board, querying a resource allocation granularity of the line card board; and
in a case where the resource allocation granularity of the line card board is a board-level granularity, determining the ordinary slice of the main control board to which the line card board belongs, and forwarding the data to the ordinary slice of the main control board; in a case where the resource allocation granularity of the line card board is the port-level granularity, determining the ordinary slice of the main control board to which a line card port belongs, and forwarding the data to the ordinary slice of the main control board.

5. The virtualization method according to claim 1, wherein
forwarding data between the ordinary slice of the main control board and the virtualization system of the line card board by using the management slice of the main control board as a communication proxy of the virtualization system of the main control board comprises:
sending, by the ordinary slice of the main control board, to-be-sent data which is sent to the line card board to the management slice of the main control board; and
in a case where a virtualization multi-slice system is configured for the line card board, sending, by the management slice of the main control board, the to-be-sent data to the management slice of the line card board; in a case where a virtualization single-slice system is configured for the line card board, changing, by the management slice of the main control board, the slice to which the to-be-sent data belongs to the management slice of the line card board, and sending, by the management slice of the main control board, the to-be-sent data to the management slice of the line card board.

6. The virtualization method according to claim 1, further comprising:
maintaining, by the management slice of the main control board, state information of the line card board, and synchronizing, by the management slice of the main control board, the state information of the line card board to the ordinary slice, to which the resource of the line card board belongs, of the main control board.

7. The virtualization method according to claim 1, wherein the management slice of the main control board first loads and validates configuration data, and then the ordinary slice of the main control board loads a private configuration file of the ordinary slice.

8. The virtualization method according to claim 1, wherein a system-level command switch for switching between a virtualization single-slice system and a virtualization multi-slice system is added to software architecture.

9. The virtualization method according to claim 1, wherein the management slice is configured to perform at least one of the following management to the ordinary slice of the virtualization system:
creating the ordinary slice, deleting the ordinary slice, enabling the ordinary slice, disabling the ordinary slice, allocating a resource for the ordinary slice, reclaiming the resource allocated to the ordinary slice, deploying a CPU of the ordinary slice, setting a mode of the ordinary slice, querying information of the ordinary slice, and switching an interface of the ordinary slice.

10. A virtualization method, applied to a line card board, the virtualization method comprising:
configuring a virtualization multi-slice system or a virtualization single-slice system for the line card board according to a quantity of a resource of the line card board, wherein the virtualization multi-slice system comprises: a management slice and an ordinary slice, and the virtualization single-slice system comprises: a management slice; and
implementing cross-board communication between a virtualization system of the line card board and a virtualization system of a main control board by means of communication between the management slice of the line card board and a management slice of the main control board, wherein
after the resource of the line card board is allocated to an ordinary slice of the main control board, in a case where the virtualization single-slice system is configured for the line card board, sending data to the management slice of the main control board through the management slice of the line card board.

11. The virtualization method according to claim 10, wherein
configuring a virtualization multi-slice system or a virtualization single-slice system for the line card board according to a quantity of a resource of the line card board comprises:
in a case where the quantity of the resource of the line card board indicates that the resource is sufficient, configuring the virtualization multi-slice system for the line card board; and
in a case where the quantity of the resource of the line card board indicates that the resource is limited, configuring the virtualization single-slice system for the line card board.

12. The virtualization method according to claim 10, wherein
implementing cross-board communication between a virtualization system of the line card board and a virtualization system of a main control board by means of communication between the management slice of the line card board and a management slice of the main control board comprises:
in a case where the virtualization multi-slice system is configured for the line card board, receiving, by the management slice of the line card board, data forwarded by the management slice of the main control board; in a case where the data actually belongs to the management slice of the line card board, processing the data by the management slice of the line card board; in a case where the data actually belongs to the ordinary slice of the line card board, forwarding, by the management slice of the line card board, the data to the ordinary slice of the line card board for processing; and
in a case where the virtualization single-slice system is configured for the line card board, receiving and processing, by the management slice of the line card board, the data forwarded by the management slice of the main control board.

13. The virtualization method according to claim 10, wherein
the resource of the line card board is allocated to the management slice or the ordinary slice of the main control board at a board-level granularity; or
the resource of the line card board is allocated to the management slice or the ordinary slice of the main control board at a port-level granularity and in a port exclusive mode; or
the resource of the line card board is allocated to the management slice and the ordinary slice of the main control board at a port-level granularity and in a port sharing mode.

14. The virtualization method according to claim 10, wherein
after the resource of the line card board is allocated to an ordinary slice of the main control board, in a case where the virtualization multi-slice system is configured for the line card board, sending data, which carries identifier information of the ordinary slice of the line card board, to the management slice of the main control board through the management slice of the line card board; wherein the ordinary slice of the line card board has a one-to-one correspondence with the ordinary slice of the main control board.

15. A virtualization apparatus, comprising:
a memory, a processor and a virtualization program which is stored in the memory and capable of running on the processor, wherein the virtualization program, when being executed by the processor, implements operations of the virtualization method according to claim 1.

16. A non-transitory computer-readable storage medium, in which a virtualization program is stored, wherein the virtualization program, when executed by a processor, implements operations of the virtualization method according to claim 1.

17. A virtualization apparatus, comprising:
a memory, a processor and a virtualization program which is stored in the memory and capable of running on the processor, wherein the virtualization program, when being executed by the processor, implements operations of the virtualization method according to claim 10.

18. A non-transitory computer-readable storage medium, in which a virtualization program is stored, wherein the virtualization program, when executed by a processor, implements operations of the virtualization method according to claim 10.

* * * * *